United States Patent
Mitobe et al.

(10) Patent No.: US 10,732,455 B2
(45) Date of Patent: Aug. 4, 2020

(54) LIQUID CRYSTAL DISPLAY DEVICE

(71) Applicant: FUJIFILM Corporation, Tokyo (JP)

(72) Inventors: Fumitake Mitobe, Kanagawa (JP); Naoya Nishimura, Kanagawa (JP); Jun Takeda, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/531,583

(22) Filed: Aug. 5, 2019

(65) Prior Publication Data
US 2019/0353958 A1 Nov. 21, 2019

Related U.S. Application Data

(63) Continuation of application No. PCT/JP2018/005742, filed on Feb. 19, 2018.

(30) Foreign Application Priority Data

Feb. 17, 2017 (JP) .................................. 2017-028251

(51) Int. Cl.
*G02F 1/1335* (2006.01)

(52) U.S. Cl.
CPC .. *G02F 1/133528* (2013.01); *G02F 1/133502* (2013.01); *G02F 1/133512* (2013.01); *G02F 2001/133531* (2013.01)

(58) Field of Classification Search
CPC ............................................... G02F 1/133512
See application file for complete search history.

(56) References Cited

U.S. PATENT DOCUMENTS

| | | | |
|---|---|---|---|
| 2005/0212994 A1 | 9/2005 | Usami | |
| 2009/0128796 A1* | 5/2009 | Tanaka | G03F 7/70566 355/77 |

(Continued)

FOREIGN PATENT DOCUMENTS

| | | |
|---|---|---|
| JP | 10-293299 A | 11/1998 |
| JP | 2005-275262 A | 10/2005 |

(Continued)

OTHER PUBLICATIONS

Extended European Search Report which was issued by the European Patent Office dated Nov. 14, 2019, in connection with European Patent Application No. 18754617.1.

(Continued)

*Primary Examiner* — Sang V Nguyen
(74) *Attorney, Agent, or Firm* — Edwards Neils LLC; Jean C. Edwards, Esq.

(57) ABSTRACT

The present invention is to provide a liquid crystal display device which is capable of suppressing reflected glare of a display screen on a windshield and the like, has excellent front contrast, and has excellent visibility of a display screen as viewed via polarized sunglasses. A liquid crystal display device includes, in order from a viewing side, a viewing side polarizer, a liquid crystal cell, a non-viewing side polarizer, and an anisotropic light absorption layer having an absorption axis in a thickness direction. The liquid crystal display device further includes at least one polarization control layer, in which the polarization control layer is arranged on a viewing side of the viewing side polarizer or on a non-viewing side of the non-viewing side polarizer.

7 Claims, 6 Drawing Sheets

(56) References Cited

U.S. PATENT DOCUMENTS

| | | | | |
|---|---|---|---|---|
| 2009/0153783 A1* | 6/2009 | Umemoto | G02B 27/28 | 349/96 |
| 2010/0171906 A1* | 7/2010 | Sakai | G02B 3/005 | 349/96 |
| 2013/0242236 A1* | 9/2013 | Shutou | G02B 5/3033 | 349/96 |
| 2014/0146273 A1* | 5/2014 | Kim | G02F 1/133536 | 349/65 |
| 2014/0177049 A1* | 6/2014 | Beck | G02F 1/37 | 359/465 |
| 2015/0350633 A1* | 12/2015 | Fang | G02F 1/13362 | 349/15 |
| 2015/0365187 A1* | 12/2015 | Kondo | H04J 14/0221 | 14/221 |
| 2017/0146807 A1* | 5/2017 | Kim | G02B 30/25 | |

FOREIGN PATENT DOCUMENTS

| | | | | |
|---|---|---|---|---|
| JP | 2007-057979 A | 3/2007 | | |
| JP | 2007057979 | * | 3/2007 | ........... G02F 1/1335 |
| JP | 2008-275976 A | 11/2008 | | |
| JP | 4902516 B2 | 1/2012 | | |
| JP | 2015-125240 A | 7/2015 | | |

OTHER PUBLICATIONS

International Search Report issued in PCT/JP2018/005742 dated May 1, 2018.
Written Opinion issued in PCT/JP2018/005742 dated May 1, 2018.
International Preliminary Report on Patentability completed by WIPO dated Aug. 20, 2019 in connection with International Patent Application No. PCT/JP2018/005742.

* cited by examiner

LIQUID CRYSTAL DISPLAY DEVICE

CROSS-REFERENCE TO RELATED APPLICATIONS

This application is a Continuation of PCT International Application No. PCT/JP2018/005742 filed on Feb. 19, 2018, which was published under PCT Article 21(2) in Japanese, and which claims priority under 35 U.S.C. § 119(a) to Japanese Patent Application No. 2017-028251 filed on Feb. 17, 2017. The above applications are hereby expressly incorporated by reference, in their entirety, into the present application.

BACKGROUND OF THE INVENTION

1. Field of the Invention

The present invention relates to a liquid crystal display device.

2. Description of the Related Art

In a case where an on-vehicle display such as a car navigation system is used, there is a problem that the light emitted upward from a display screen is reflected on a windshield or the like, which may interfere in driving. In order to solve such a problem, for example, JP4902516B proposes a method in which a film in which a dichroic substance is vertically aligned is arranged on a viewing side polarizer side.

SUMMARY OF THE INVENTION

A viewing angle control method using a film in which a dichroic substance is vertically aligned (that is, a film in which the absorption axis of the dichroic substance is in the thickness direction of the film) has a problem that a direction in which the viewing angle can be controlled is determined by the direction of the absorption axis of a polarizer used in a liquid crystal display device.

For example, in a general liquid crystal display device, assuming a case where an observer wears polarized sunglasses (generally, polarized sunglasses of which the transmission axis is in a machine direction relative to the surface of the lens) or the like and views a display screen, the direction of the absorption axis of the viewing side polarizer is set to a transverse direction relative to the display screen (that is, in a direction orthogonal to the transmission axis of the polarized sunglasses). Therefore, in order to control the light emitted upward (in a machine direction) from the display screen, it is necessary to arrange a film in which a dichroic substance is vertically aligned (anisotropic light absorption layer) on the viewing side polarizer side disclosed in JP4902516B.

However, the present inventors have found that in a case where the film in which the dichroic substance is vertically aligned is arranged on the viewing side polarizer side as disclosed in JP4902516B and the display screen of the liquid crystal display device is viewed from the front, the contrast is not sufficient (that is, deteriorated in front contrast).

As described above, there is a trade-off relationship between suppression of reflected glare of a display screen of a liquid crystal display device on a windshield of a vehicle (for example, an automobile, a train, and the like) or the like, and excellent front contrast of the display screen of the liquid crystal display device.

An object of the present invention is to provide a liquid crystal display device which is capable of suppressing reflected glare of a display screen on a windshield and the like, has excellent front contrast, and has excellent visibility of the display screen as viewed via polarized sunglasses.

The present inventors have found that the above object can be achieved by, in a liquid crystal display device comprising, in order from a viewing side, a viewing side polarizer, a liquid crystal cell, a non-viewing side polarizer, and an anisotropic light absorption layer having an absorption axis in a thickness direction, arranging a polarization control layer on a viewing side of the viewing side polarizer or on a non-viewing side of the non-viewing side polarizer, and thus have completed the present invention.

That is, it has been found that the above object can be achieved by adopting the following configurations.

[1] A liquid crystal display device comprising, in order from a viewing side: a viewing side polarizer; a liquid crystal cell; a non-viewing side polarizer; and an anisotropic light absorption layer having an absorption axis in a thickness direction, in which the liquid crystal display device further comprises at least one polarization control layer, and the polarization control layer is arranged on a viewing side of the viewing side polarizer or on a non-viewing side of the non-viewing side polarizer.

[2] The liquid crystal display device according to [1], in which an absorption axis of the viewing side polarizer is in a machine direction, an absorption axis of the non-viewing side polarizer is in a transverse direction, the polarization control layer is arranged on a viewing side of the viewing side polarizer, and the polarization control layer rotates linearly polarized light vertically incident into a plane of the polarization control layer by 80° to 100°.

[3] The liquid crystal display device according to [1], in which an absorption axis of the viewing side polarizer is in a machine direction, an absorption axis of the non-viewing side polarizer is in a transverse direction, the polarization control layer is arranged on a viewing side of the viewing side polarizer, and the polarization control layer converts a polarization axis of linearly polarized light vertically incident into a plane of the polarization control layer.

[4] The liquid crystal display device according to [1], in which an absorption axis of the viewing side polarizer is in a machine direction, an absorption axis of the non-viewing side polarizer is in a transverse direction, the polarization control layer is arranged on a viewing side of the viewing side polarizer, and the polarization control layer converts linearly polarized light vertically incident into a plane of the polarization control layer into circularly polarized light.

[5] The liquid crystal display device according to [1], in which an absorption axis of the viewing side polarizer is in a machine direction, an absorption axis of the non-viewing side polarizer is in a transverse direction, the polarization control layer is arranged on a viewing side of the viewing side polarizer, and the polarization control layer depolarizes polarized light.

[6] The liquid crystal display device according to [1], in which an absorption axis of the viewing side polarizer is in a transverse direction, an absorption axis of the non-viewing side polarizer is in a machine direction, the polarization control layer is arranged on a non-viewing side of the non-viewing side polarizer, and the polarization control layer rotates linearly polarized light vertically incident into a plane of the polarization control layer by 80° to 100°.

[7] The liquid crystal display device according to [1], in which an absorption axis of the viewing side polarizer is in a transverse direction, an absorption axis of the non-viewing side polarizer is in a machine direction, the polarization control layer is arranged on a non-viewing side of the non-viewing side polarizer, and the polarization control layer converts a polarization axis of linearly polarized light vertically incident into a plane of the polarization control layer.

According to the present invention, it is possible to provide a liquid crystal display device which is capable of suppressing reflected glare of a display screen on a windshield and the like, has excellent front contrast, and has excellent visibility of the display screen as viewed via polarized sunglasses.

DESCRIPTION OF THE PREFERRED EMBODIMENTS

Figure 1:
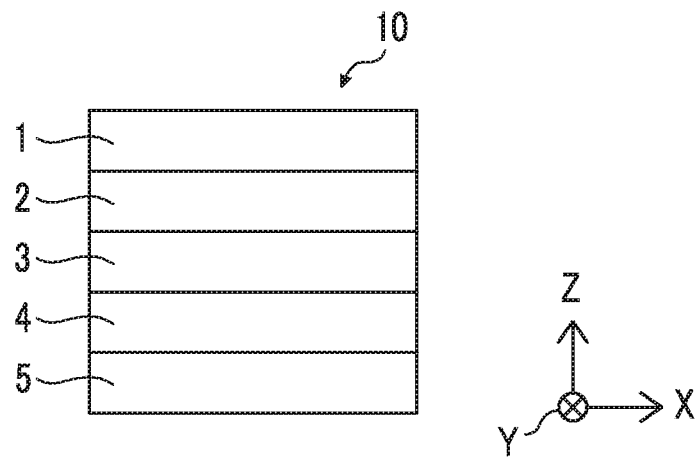
FIG. 1 is a top view schematically showing an example of a liquid crystal display device according to the present invention.

Hereinafter, the present invention will be described in detail.

The description of the constitutional requirements described below is made on the basis of representative embodiments of the present invention, but it should not be construed that the present invention is limited to those embodiments.

In this specification, numerical value ranges expressed by the term "to" mean that the numerical values described before and after "to" are included as a lower limit and an upper limit, respectively.

Further, in this specification, the terms "parallel" and "orthogonal" do not mean parallel or orthogonal in the strict meaning but mean a range of ±5° from parallel or orthogonal.

In the present invention, $Re(\lambda)$ and $Rth(\lambda)$ each represent an in-plane retardation and a retardation in a thickness-direction at a wavelength $\lambda$. Unless otherwise specified, the wavelength $\lambda$ is 550 nm.

In the present invention, $Re(\lambda)$ and $Rth(\lambda)$ are values measured at a wavelength $\lambda$ by AxoScan OPMF-1 (manufactured by Opto Science, Inc.). By inputting the average refractive index $((nx+ny+nz)/3)$ and the film thickness (d ($\mu$m)) to AxoScan, it is possible to calculate slow axis direction (°)

$$Re(\lambda) = R0(\lambda)$$

$$Rth(\lambda) = ((nx+ny)/2 - nz) \times d.$$

In addition, $R0(\lambda)$ represents a numerical value calculated by AxoScan OPMF-1 and indicates $Re(\lambda)$.

In the present specification, refractive indices nx, ny, and nz are measured by using an Abbe Refractometer (NAR-4T, manufactured by Atago Inc.) and a sodium lamp ($\lambda=589$ nm) as a light source. In addition, in a case where wavelength dependency is measured, the wavelength dependency can be measured in combination with an interference filter by a multi-wavelength Abbe refractometer DR-M2 (manufactured by Atago Co., Ltd).

Further, the catalog values of Polymer Handbook (JOHN WILEY & SONS, INC) and various optical films can also be used. The values of the average refractive indices of main optical films are as follows: cellulose acylate (1.48); cycloolefin polymer (1.52); polycarbonate (1.59); polymethyl methacrylate (1.49); and polystyrene (1.59).

In the present specification, the concept of a liquid crystal compound includes a compound which no longer exhibits liquid crystallinity by curing or the like.

Liquid Crystal Display Device

A liquid crystal display device according to an embodiment of the present invention is a liquid crystal display device comprising, in order from a viewing side, a viewing side polarizer, a liquid crystal cell, a non-viewing side polarizer, and an anisotropic light absorption layer having an absorption axis in a thickness direction. In addition, the liquid crystal display device according to the embodiment of the present invention further comprises at least one polarization control layer, and the polarization control layer is arranged on a viewing side of the viewing side polarizer or a non-viewing side of the non-viewing side polarizer.

According to the liquid crystal display device according to the embodiment of the present invention, the reflected glare of a display screen on a windshield and the like can be suppressed, the front contrast is excellent, and the visibility of a display screen is excellent as viewed via polarized sunglasses. The details of the reasons are not clear, but it is assumed that such effects are obtained due to the following reasons.

In the present invention, in a case where the liquid crystal display device is placed in a predetermined use state, a direction along a vertical direction of a display screen is referred to as a machine direction, and a direction along a direction orthogonal to the vertical direction (horizontal direction) of the display screen is referred to as a transverse direction. In general, the display screen of the liquid crystal display device is preferably arranged to be substantially parallel to the vertical direction. In the present specification, the term "substantially parallel" means to include a range of ±10° from being parallel.

In addition, in the present invention, the fact that the absorption axis of the polarizer is in a machine direction means that the absorption axis of the polarizer is in a direction along the machine direction of the display screen, and the fact that the absorption axis of the polarizer is in a transverse direction means that the absorption axis direction of polarization is a direction along the transverse direction of the display screen.

Further, in the present invention, the term "non-viewing side" means a side opposite to the viewing side of the liquid crystal display device (rear side).

First, using an embodiment of Comparative Example 2 described later (the embodiment of JP4902516B described above) as an example, the reason why a liquid crystal display device of the related art has excellent visibility of a display screen as viewed via sunglasses and is capable of suppressing reflected glare of the display screen on a windshield will be described.

In the liquid crystal display device of Comparative Example 2 described later, an anisotropic light absorption layer (absorption axis: the thickness direction of the layer), a viewing side polarizer (absorption axis: transverse direction), a liquid crystal cell, and a non-viewing side polarizer (absorption axis: machine direction) are arranged in this order from a viewing side.

First, among light beams emitted from a light source on a non-viewing side of the non-viewing side polarizer, a light beam travelling to a windshield will be described.

In a case where the light emitted from the light source on the non-viewing side of the non-viewing side polarizer and incident into the non-viewing side polarizer in an oblique direction (that is, light travelling to the windshield) is transmitted through the non-viewing side polarizer, the liquid crystal cell, and the viewing side polarizer, the light transmitted through the viewing side polarizer (absorption axis: transverse direction) is converted into linearly polarized light parallel to the machine direction.

Here, the direction of the absorption axis of the anisotropic light absorption layer is apparently a machine direction with respect to light incident into the anisotropic light absorption layer in the oblique direction (that is, the light travelling to the windshield). Therefore, the light travelling to the windshield after being transmitted through the viewing side polarizer (linearly polarized light parallel to the machine direction) is absorbed by the anisotropic light absorption layer. Therefore, the light travelling to the windshield does not easily cause reflected glare on the display screen.

Next, among the light beams emitted from the light source on the non-viewing side of the non-viewing side polarizer, the light beam travelling to the front direction of the non-viewing side polarizer (hereinafter, also referred to as "light in the front direction") will be described.

In a ease where the light emitted from the light source on the non-viewing side of the non-viewing side polarizer and travelling to the front direction of the non-viewing side polarizer is transmitted through the non-viewing side polarizer, the liquid crystal cell, and the viewing side polarizer, the light transmitted through the viewing side polarizer (absorption axis: transverse direction) is converted into linearly polarized light parallel to the machine direction.

In addition, since the anisotropic light absorption layer has an absorption axis in the thickness direction, even after the light in the front direction transmitted through the viewing side polarizer (linearly polarized light parallel to the machine direction) is transmitted through the anisotropic light absorption layer, the linearly polarized light parallel to the machine direction is maintained. Accordingly, since the light in the front direction is transmitted through the sunglasses (generally, the direction of the transmission axis is the machine direction relative to the surface of the lens), the visibility of the display screen as viewed via the sunglasses is excellent.

As described above, in the case where the anisotropic light absorption layer is arranged on the viewing side of the viewing side polarizer (the embodiment of Comparative Example 2), the visibility of the display screen as viewed via the sunglasses is excellent and the reflected glare of the display screen on the windshield can be suppressed. However, in this embodiment, it is determined that the front contrast is deteriorated.

With respect to this problem, the present inventors have conducted intensive investigations and thus found that in a case where the anisotropic light absorption layer is arranged on the viewing side of the non-viewing side polarizer, the front contrast is excellent.

Here, the contrast is a value obtained by dividing the brightness of white display by the brightness of black display. Therefore, even in a case where the anisotropic light absorption layer is arranged at any position in the liquid crystal display device, it is considered that the front contrast does not change because both the brightness of the white display and the brightness of the black display decrease at the same rate. However, surprisingly, it has been found that in a case where the anisotropic light absorption layer is arranged on the non-viewing side of the non-viewing side polarizer, compared to a case where the anisotropic light absorption layer is arranged on the viewing side of the viewing side polarizer, the front contrast is excellent.

However, as shown in Comparative Example 3 described later, from the viewpoint of front contrast, by simply arranging an anisotropic light absorption layer on a non-viewing side of a non-viewing side polarizer, reflected glare of a display screen on a windshield may not be suppressed in some cases.

Here, the present inventors have further conducted intensive investigations and thus found that in a case where the polarization control layer is arranged at a predetermined position in the liquid crystal display device, a liquid crystal display device capable of achieving both suppression of reflected glare of a display screen on a windshield or the like and excellent front contrast, and having excellent visibility of a display screen as viewed via polarized sunglasses is obtained.

In the following, the structures of the liquid crystal display device according to the embodiments of the present invention will be described in detail for each embodiment with reference to the drawings, and then each member constituting the liquid crystal display device will be described.

First Embodiment

FIG. 1 is a top view schematically showing an example (first embodiment) of a liquid crystal display device according to the present invention. In FIG. 1, a direction X indicates a transverse direction of a display screen of a liquid crystal display device 10, a direction Y indicates a machine direction of the display screen of the liquid crystal display device 10, a direction Z indicates a thickness direction of the liquid crystal display device 10 (lamination direction of each member).

As shown in FIG. 1, the liquid crystal display device 10 comprises, in order from a viewing side, a polarization control layer 1, a viewing side polarizer 2 having an absorption axis in a machine direction (Y direction), a liquid crystal cell 3, a non-viewing side polarizer 4 having an absorption axis in a transverse direction (X direction), and an anisotropic light absorption layer 5 having an absorption axis in a thickness direction (Z direction).

The polarization control layer 1 is a layer for rotating linearly polarized light vertically incident into the plane of the polarization control layer 1 by 80° to 100° or a layer for converting a polarization axis of linearly polarized light vertically incident into the plane of the polarization control layer 1.

The reason why the liquid crystal display device 10 according to the first embodiment exhibits the above-described effect will be described.

First, among light beams emitted from a light source (not shown) on a non-viewing side of the anisotropic light absorption layer 5, a light beam travelling to a windshield will be described.

The direction of the absorption axis of the anisotropic light absorption layer 5 is apparently a machine direction with respect to light incident from an oblique direction relative to the anisotropic light absorption layer 5 (that is, light travelling to the windshield). Therefore, the light travelling to the windshield is transmitted through the anisotropic light absorption layer 5, and then is converted into linearly polarized light parallel to the transverse direction.

Subsequently, the light travelling to the windshield after being transmitted through the anisotropic light absorption layer 5 (linearly polarized light parallel to the transverse direction) is absorbed by the non-viewing side polarizer 4 (absorption axis: transverse direction). Therefore, the light travelling to the windshield does not easily cause reflected glare on the display screen.

Next, among the light beams emitted from the light source on the non-viewing side of the anisotropic light absorption layer 5, the light beam travelling to the front direction of the anisotropic light absorption layer (hereinafter, also referred to as "light in the front direction") will be described.

Since the anisotropic light absorption layer 5 has an absorption axis in the thickness direction, the light in the front direction transmitted through the anisotropic light absorption layer 5 is unpolarized.

Subsequently, the light in the front direction transmitted through the anisotropic light absorption layer 5 is absorbed by the non-viewing side polarizer 4 (absorption axis: transverse direction). Accordingly, the light in the front direction transmitted through the non-viewing side polarizer 4 is linearly polarized light mainly parallel to the machine direction.

Subsequently, the vibration direction of the light in the front direction transmitted through the non-viewing side polarizer 4 (linearly polarized light parallel to the machine direction) is converted by the liquid crystal cell 3 and is turned into linearly polarized light parallel to the transverse direction.

The light in the front direction transmitted through the liquid crystal cell 3 (linearly polarized light parallel to the transverse direction) is transmitted through the viewing side polarizer 2 (absorption axis: machine direction) and is converted into linearly polarized light parallel to the machine direction by the polarization control layer 1 (which is a layer for rotating linearly polarized light vertically incident into the plane of the polarization control layer 1 by 80° to 100° or a layer for converting the polarization axis of the linearly polarized light vertically incident into the plane of the polarization control layer 1). Accordingly, since the light in the front direction is transmitted through sunglasses (generally, the transmission axis is in the machine direction relative to the surface of the lens), the visibility of the display screen as viewed via the sunglasses is excellent.

Modification Example 1

Figure 2:
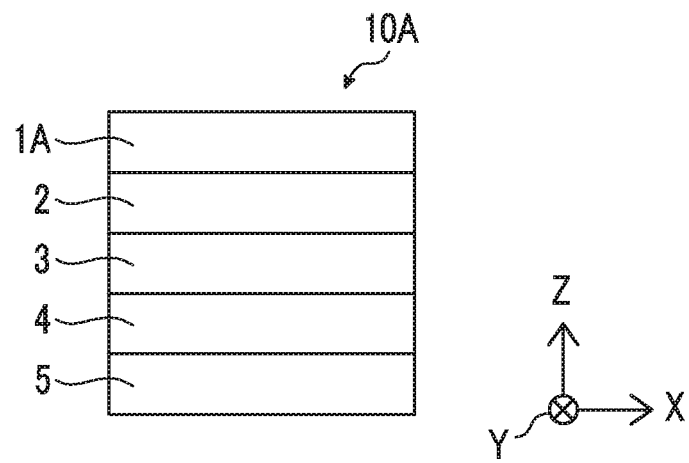
FIG. 2 is a top view schematically showing an example of the liquid crystal display device according to the present invention.

FIG. 2 is a top view schematically showing a liquid crystal display device 10A as a modification example of the first embodiment (hereinafter, also referred to as "Modification Example 1"). The liquid crystal display device 10A has the same structure as the liquid crystal display device 10 except that instead of the polarization control layer 1 of the liquid crystal display device 10, a polarization control layer 1A is used.

The polarization control layer 1A is a layer for converting linearly polarized light vertically incident into the plane of the polarization control layer 1A into circularly polarized light.

The reason why the liquid crystal display device 10A exhibits the above-described effect will be described.

Among light beams emitted from a light source (not shown) on the non-viewing side of the anisotropic light absorption layer 5, a light beam travelling to a windshield does not easily cause reflected flare on the windshield for the same reason as in the first embodiment.

Next, among the light beams emitted from the light source on the non-viewing side of the anisotropic light absorption layer 5, the light in the front direction will be described.

The light in the front direction is transmitted through the liquid crystal cell 3 and then is converted into linearly polarized light parallel to the transverse direction for the same reason as in the first embodiment.

Since the light in the front direction transmitted through the liquid crystal cell 3 (linearly polarized light parallel to the transverse direction) is transmitted through the viewing side polarizer 2 (absorption axis: machine direction) and the polarization control layer 1A (which is a layer for converting linearly polarized light vertically incident into the plane of the polarization control layer 1A into circularly polarized light), the light is converted into circularly polarized light. Thus, since a part of the light in the front direction is transmitted through sunglasses (generally, the transmission axis is in the machine direction relative to the surface of the lens; the same applies to the followings), the visibility of the display screen as viewed via the sunglasses is excellent.

Modification Example 2

Figure 3:
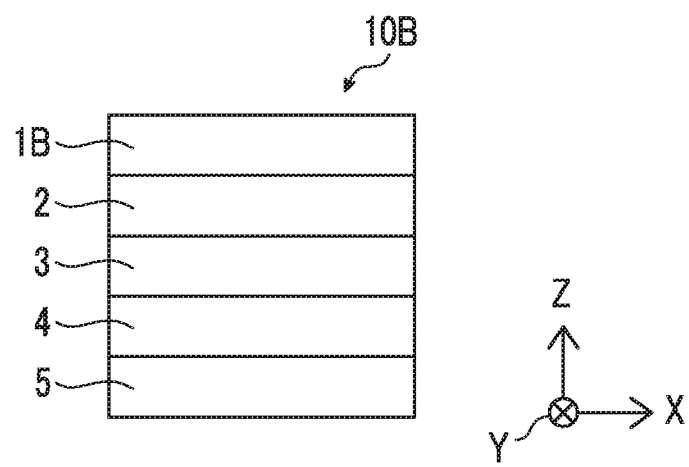
FIG. 3 is a top view schematically showing an example of the liquid crystal display device according to the present invention.

FIG. 3 is a top view schematically showing a liquid crystal display device 10B as a modification example of the first embodiment (hereinafter, also referred to as "Modification Example 2"). The liquid crystal display device 10B has the same structure as the liquid crystal display device 10 except that instead of the polarization control layer 1 of the liquid crystal display device 10, a polarization control layer 1B is used.

The polarization control layer 1B is a polarization control layer for depolarizing polarized light.

The reason why the liquid crystal display device 10B exhibits the above-described effect will be described.

Among light beams emitted from a light source (not shown) on the non-viewing side of the anisotropic light absorption layer 5, a light beams travelling to a windshield does not easily cause reflected glare on the windshield by the same reason as in the first embodiment.

Next, among the light beams emitted from the light source on the non-viewing side of the anisotropic light absorption layer 5, the light in the front direction will be described.

The light in the front direction is transmitted through the liquid crystal cell 3 and then is converted into linearly polarized light parallel to the transverse direction for the same reason as in the first embodiment.

The light in the front direction transmitted through the liquid crystal cell 3 (linearly polarized light parallel to the transverse direction) is transmitted through the viewing side polarizer 2 (absorption axis: machine direction) and is unpolarized by the polarization control layer 1B (which is a layer for depolarizing polarized light). Accordingly, since the light in the front direction is transmitted through sunglasses, the visibility of the display screen as viewed via the sunglasses is excellent.

Second Embodiment

Figure 4:
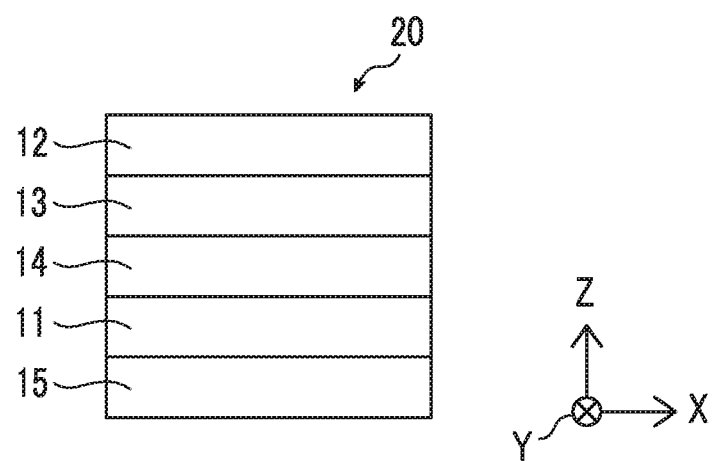
FIG. 4 is a top view schematically showing an example of the liquid crystal display device according to the present invention.
Figure 5:
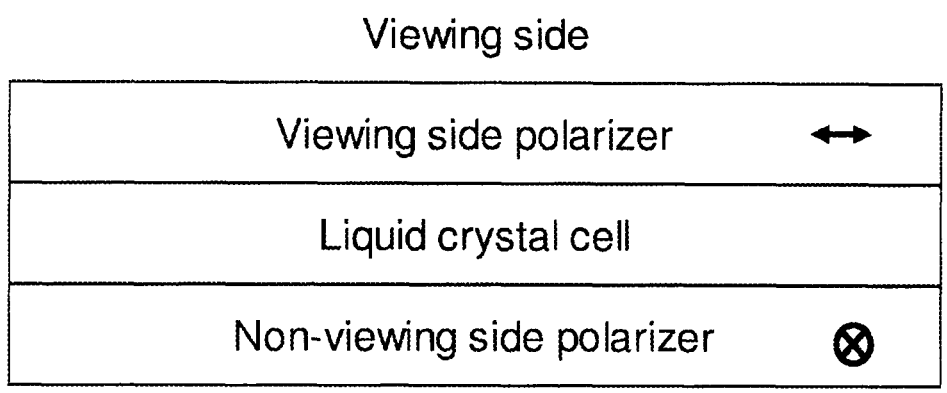
FIG. 5 shows the arrangement of each member in liquid crystal display device in Comparative Example 1.
Figure 6:
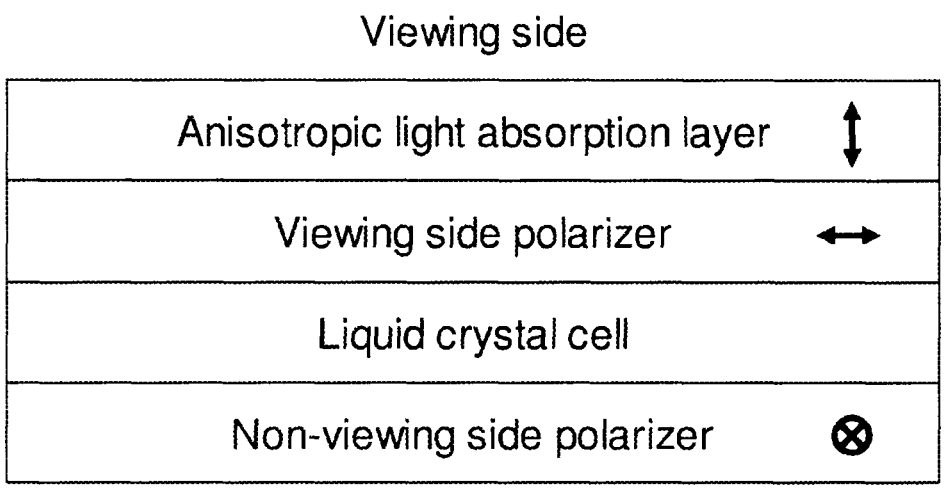
FIG. 6 shows the arrangement of each member in liquid crystal display device in Comparative Example 2.
Figure 7:
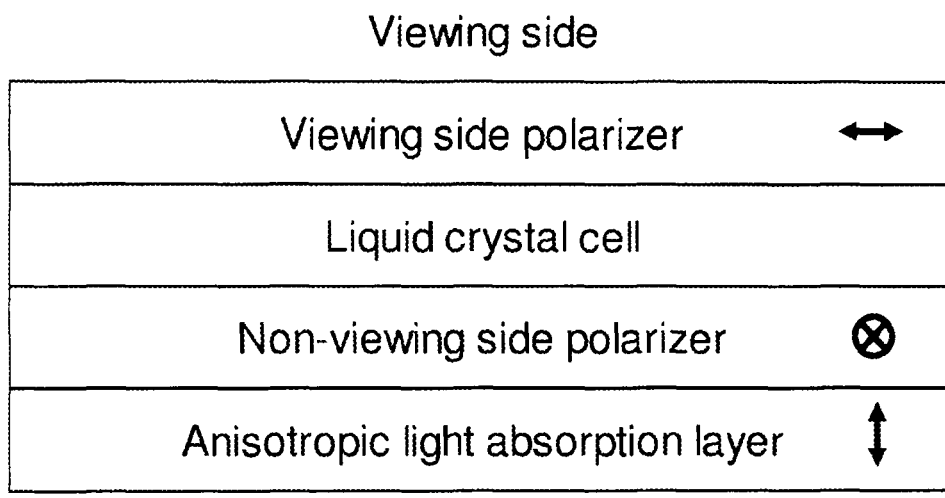
FIG. 7 shows the arrangement of each member in liquid crystal display device in Comparative Example 3.
Figure 8:
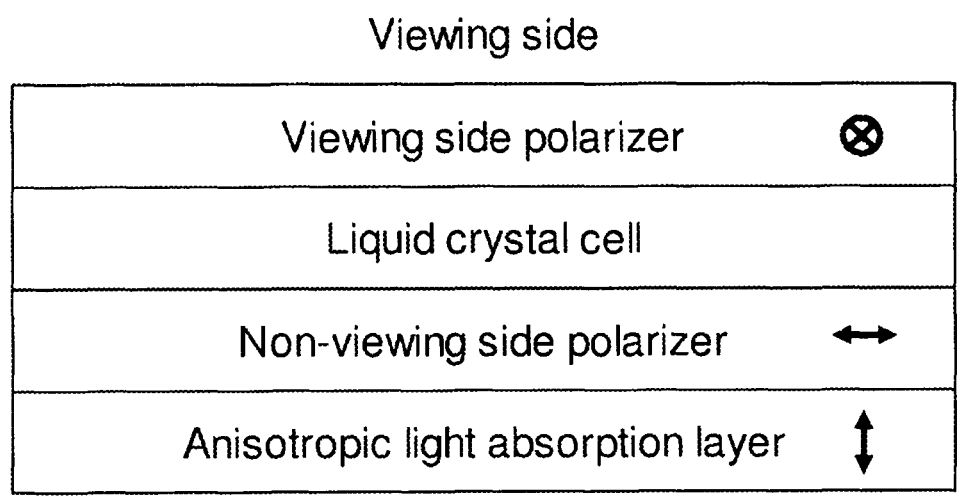
FIG. 8 shows the arrangement of each member in liquid crystal display device in Comparative Example 4.
Figure 9:
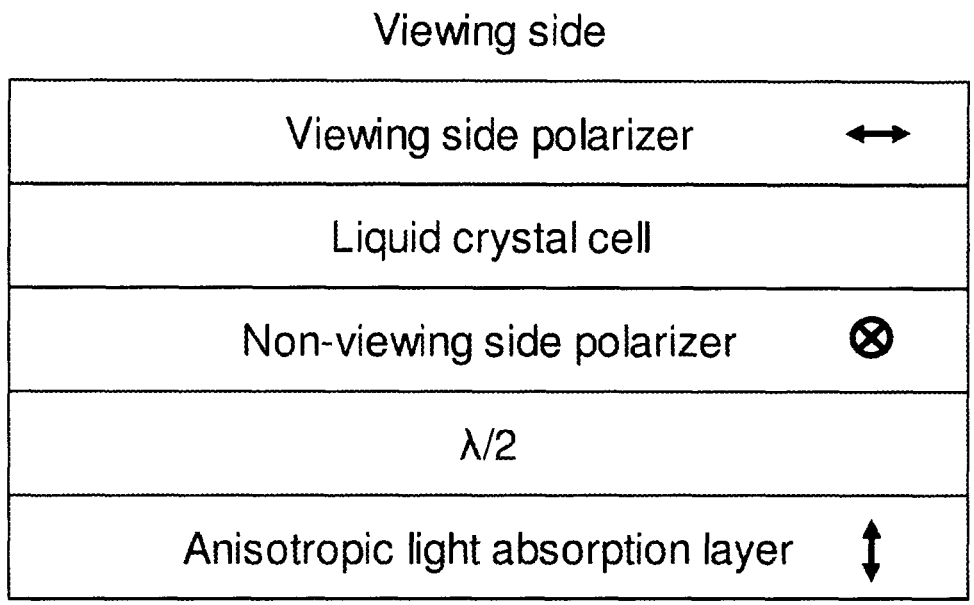
FIG. 9 shows the arrangement of each member in liquid crystal display device in Example 1.
Figure 10:
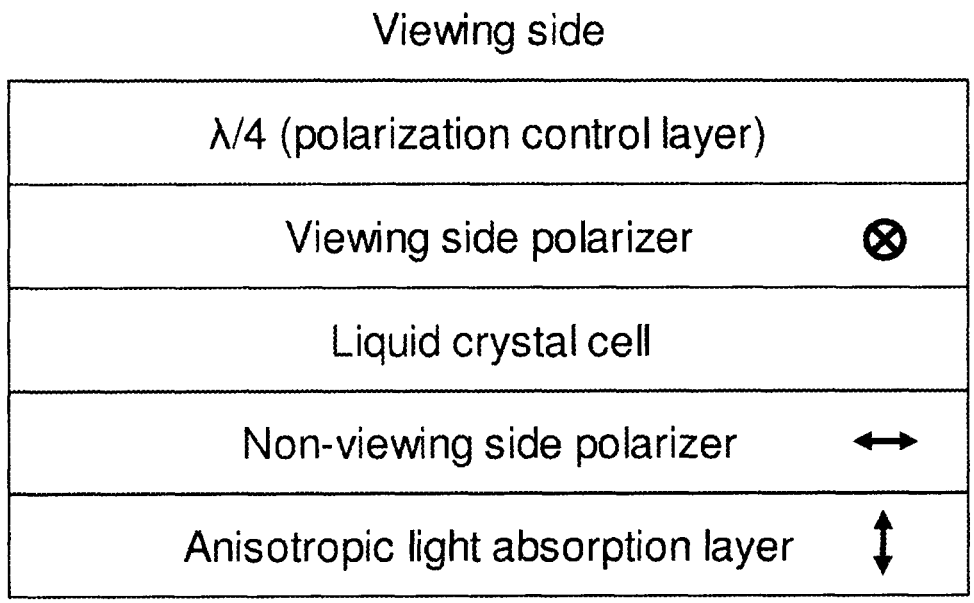
FIG. 10 shows the arrangement of each member in liquid crystal display device in Example 2.
Figure 11:
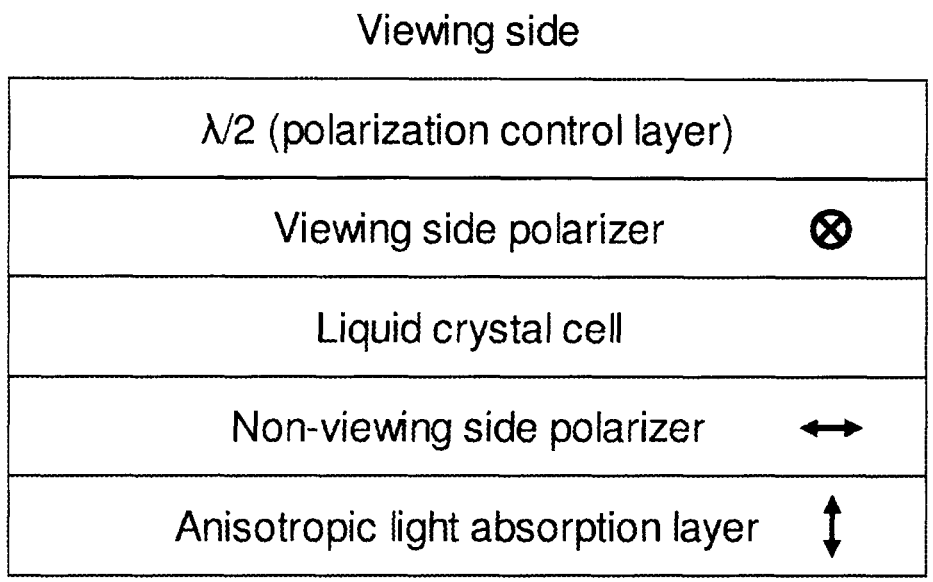
FIG. 11 shows the arrangement of each member in liquid crystal display device in Example 3.
Figure 12:
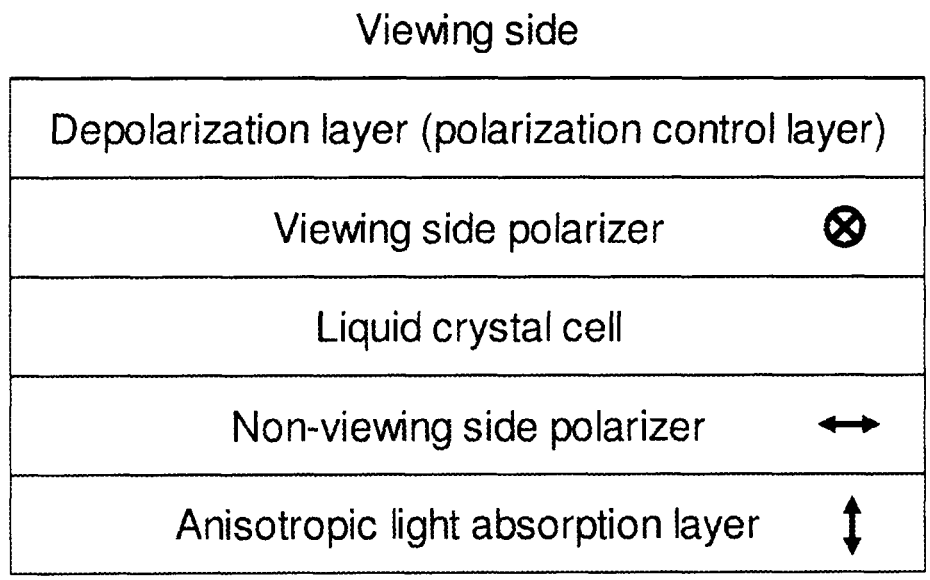
FIG. 12 shows the arrangement of each member in liquid crystal display device in Example 4.

FIG. 4 is a top view schematically showing an example (second embodiment) of the liquid crystal display device according to the present invention. In FIG. 4, the definitions of respective directions X, Y, and Z are the same as the definitions of the directions X, Y, and Z in FIG. 1.

As shown in FIG. 4, a liquid crystal display device 20 comprises, in order from a viewing side, a viewing side polarizer 12 having an absorption axis in a transverse direction (direction X), a liquid crystal cell 13, a non-viewing side polarizer 14 having an absorption axis in a machine direction (direction Y), a polarization control layer 11, and an anisotropic light absorption layer 15 having an absorption axis in a thickness direction (direction. Z).

The polarization control layer 11 is a layer for rotating linearly polarized light vertically incident into the plane of the polarization control layer 11 by 80° to 100° or a layer for converting a polarization axis of linearly polarized light vertically incident into the plane of the polarization control layer 11.

The reason why the liquid crystal display device 20 according to the second embodiment exhibits the above-described effect will be described.

First, among light beams emitted from a light source (not shown) on a non-viewing side of the anisotropic light absorption layer 15, a light beam travelling to a windshield will be described.

The direction of the absorption axis of the anisotropic light absorption layer 15 is apparently in a machine direction with respect to light incident into the anisotropic light absorption layer 15 in an oblique direction (that is, light travelling to the windshield). Therefore, the tight travelling to the windshield is transmitted through the anisotropic light absorption layer 15 and then is converted into linearly polarized light parallel to the transverse direction.

Subsequently, the light travelling to the windshield after being transmitted through the anisotropic light absorption layer 15 (linearly polarized light parallel to the transverse direction) is transmitted through the polarization control layer 11 (which is a layer for rotating linearly polarized light vertically incident into the plane of the polarization control layer 11 by 80° to 100° or a layer for converting a polarization axis of linearly polarized light vertically incident into the plane of the polarization control layer 11) and then is converted into linearly polarized light parallel to the machine direction.

Subsequently, the light travelling to the windshield after being transmitted through the polarization control layer 11 (linearly polarized light parallel to the machine direction) is absorbed by the non-viewing side polarizer 14 (absorption axis: machine direction). Therefore, the light travelling to the windshield does not easily cause reflected glare on the display screen.

Next, among light beams emitted from a light source on the non-viewing side of the anisotropic light absorption layer 15, a light beam in the front direction will be described.

Since the anisotropic light absorption layer 15 has an absorption axis in the thickness direction, the light in the front direction transmitted through the anisotropic light absorption layer 15 is unpolarized.

Subsequently, the light in the front direction transmitted through the anisotropic light absorption layer 15 (unpolarized light) is transmitted through the polarization control layer 11 and then is converted into linearly polarized light parallel to the transverse direction by the non-viewing side polarizer 14 (absorption axis: machine direction).

Subsequently, the vibration direction of the light in the front direction transmitted through the non-viewing side polarizer 14 (linearly polarized light parallel to the transverse direction is converted by the liquid crystal cell 13 and is turned into linearly polarized light parallel to the machine direction.

Subsequently, the light in the front direction transmitted through the liquid crystal cell 13 (linearly polarized light parallel to the machine direction) is transmitted through the viewing side polarizer 12 (absorption axis: transverse direction). Accordingly, since the light in the front direction is transmitted through sunglasses (generally, the transmission axis is in the machine direction relative to the surface of the lens), the visibility of the display screen as viewed via the sunglasses is excellent.

Member Constituting Liquid Crystal Display Device

Next, each member constituting the liquid crystal display device according to the embodiment of the present invention will be described in detail.

Anisotropic Light Absorption Layer Having Absorption Axis in Thickness Direction The liquid crystal display device according to the embodiment of the present invention comprises an anisotropic light absorption layer having an absorption axis in the thickness direction (hereinafter, also simply referred to as an "anisotropic light absorption layer").

The material constituting the anisotropic light absorption layer is not particularly limited.

For example, an anisotropic light absorption layer in which at least one dichroic substance is aligned vertical to the plane may be used.

As a technology of aligning a dichroic substance to a desired alignment, a technology of preparing a polarizer using a dichroic substance, a technology of preparing a guest-host type liquid crystal cell, and the like can be referred to. For example, technologies used in a method of preparing a dichroic polarizing element described in JP2002-090526A, and a method of preparing a guest-host type liquid crystal display device described in JP2002-099388A can be used in preparation of the anisotropic light absorption layer in the present invention.

Dichroic substances can be classified into a dichroic substance having a rod-like molecular shape and a dichroic substance having a disk-like molecular shape. Any of these dichroic substances may be used in preparation of the anisotropic light absorption layer in the present invention.

Preferable examples of the dichroic substance having a rod-like molecular shape include azo dyes, anthraquinone dyes, perylene dyes, and mericyanine dyes. Specifically, examples of azo dyes include those described in JP1999-172252A (JP-H11-172252A), examples of anthraquinone dyes include those described in JP1996-067822A (JP-H08-067822A), examples of perylene dyes include those described in JP1987-129380A (JP-S62-129380A), and examples of mericyanine dyes include those described in JP2002-241758A. These may be used alone or in combination of two or more kinds thereof.

As an example of the dichroic substance having a disc-like molecular shape, a lyotropic liquid crystal as represented by those of OPTIVA Inc. may be used and a dichroic substance which is used as an "E-Type polarizer" is known. For example, materials described in JP2002-090547A are exemplified. In addition, there is an example using a bis-azo-based dichroic substance which utilizes a worm-like micelle type structure as a chemical structure of similarly absorbing light in a disc-like form, and materials described in JP2002-090526A are exemplified. These may be used alone or in combination of two or more kinds thereof.

As the material of the anisotropic light absorption layer in the present invention, from the viewpoint of farther exhibiting the effects of the present invention, it is preferable to use a rod-like dichroic material.

For example, the molecules of the dichroic substance can be made in a desired alignment as described above while accompanying the alignment of the host liquid crystal by using the guest-host type liquid crystal cell technology. Specifically, the anisotropic light absorption layer in the present invention can be prepared by mixing a dichroic substance serving as a guest and a rod-like liquid crystal compound serving as a host liquid crystal, while aligning the host liquid crystal, aligning the molecules of the dichroic substance along the alignment of the liquid crystal molecules, and fixing the alignment state.

In order to prevent fluctuation of the light absorption properties of the anisotropic light absorption layer in the present invention due to the use environment, the alignment of the dichroic substance is preferably fixed by forming a chemical bond. For example, the alignment can be fixed by advancing polymerization of the host liquid crystal, the dichroic substance, or a polymerizable component to be added if desired.

In addition, a guest-host type liquid crystal cell having a liquid crystal layer including at least a dichroic substance and a host liquid crystal on a pair of substrates may be used as the anisotropic light absorption layer in the present invention. The alignment of the host liquid crystal (and the accompanying alignment of the molecules of the dichroic substance) can be controlled by an alignment film formed in the surface of the substrate, and unless an external stimulus such as an electric field is applied, the alignment state is maintained so that the light absorption properties of the anisotropic light absorption layer in the present invention can be fixed.

In addition, a polymer film satisfying the light absorption properties required for the anisotropic light absorption layer in the present invention can be prepared by allowing penetration of a dichroic substance into the polymer film and aligning the dichroic substance along the alignment of the polymer molecule in the polymer film. Specifically, the polymer film can be prepared by applying a solution of a dichroic substance to the surface of the polymer film to allow penetration of the dichroic substance into the film. The alignment of the dichroic substance can be adjusted by the alignment of a polymer chain in the polymer film and properties thereof (such as chemical and physical properties of the polymer chain or a functional group which the polymer chain has), a coating method, and the like. The details of this method are described in JP2002-090526A.

Polarization Control Layer

The liquid crystal display device according to the embodiment of the present invention comprises a polarization control layer.

As the polarization control layer in the present invention, a polarization control layer for rotating linearly polarized light vertically incident into the plane of the polarization control layer, a polarization control layer for converting a polarization axis of linearly polarized light vertically incident into the plane of the polarization control layer, a polarization control layer for converting linearly polarized light vertically incident into the plane of the polarization control layer into circularly polarized light, and a polarization control layer for depolarizing polarized light may be used.

(Polarization Control Layer for Rotating Linearly Polarized Light)

The polarization control layer for rotating linearly polarized light used in the present invention is not particularly limited as long as the polarization control layer is a polarization control layer for rotating linearly polarized light vertically incident into the plane of the polarization control layer. The angle for rotating linearly polarized light is preferably 80° to 100° and more preferably 85° to 95°.

As the polarization control layer for rotating linearly polarized light, an optical rotation film may be used.

The optical rotation film is an optical element having optical rotation and the term "having optical rotation" in the present invention means that linearly polarized light rotates and propagates as almost linearly polarized light in a medium. The production method is described in JP-2006-072273A and the like.

(Polarization Control Layer for Converting Polarization Axis of Linearly Polarized Light)

As the polarization control layer for converting a polarization axis of linearly polarized light used in the present invention, a λ/2 film may be used.

The λ/2 film may be an optical anisotropic support having a desired λ/2 function by the support itself or may have an optically anisotropic layer or the like on a support formed of a polymer film. That is, in the latter case, the desired λ/2 function is provided by laminating another layer on the support. The material constituting the optically anisotropic layer is not particularly limited, and the optically anisotropic layer may be a layer that is formed of a composition containing a liquid crystal compound and has optical anisotropy developed by the alignment of the molecules of the liquid crystal compound or a layer having optical anisotropy developed by aligning a polymer in a polymer film by stretching the polymer film, or may have both layers. That is, the optically anisotropic layer can be formed by one or two or more biaxial films or can be formed by combining two or more uniaxial films such as a combination of a C-plate and an A-plate or the like. Of course, the optically anisotropic layer can also be formed by combining two or more biaxial films and one or more uniaxial films.

Here, the λ/2 film refers to an optically anisotropic layer in which an in-plane retardation $Re(\lambda)$ at a specific wavelength of λ nm satisfies "$Re(\lambda) \cong \lambda/2$". The above equation may be achieved at any wavelength in a visible range (for example, 550 nm). In the range, Re(550) of the λ/2 film is preferably 200 to 320 nm.

(Polarization Control Layer the Converting Linearly Polarized Light into Circularly Polarized Light)

The polarization control layer for converting linearly polarized light into circularly polarized light used in the present invention is not particularly limited as long as the polarization control layer is a polarization control layer for converting linearly polarized light vertically incident into the plane of the polarization control layer into circularly polarized light.

As an example of the polarization control layer for converting linearly polarized light into circularly polarized light, a λ/4 film maybe used. The λ/4 film may be a single layer or a laminate of two or more layers, and is preferably a laminate of two or more layers.

The λ/4 film may have an embodiment having an alignment film, and an optically anisotropic layer formed using a liquid crystal compound on a support formed of a transparent film.

The retardation (Rth) of the λ/4 film in the thickness direction preferably has a value close to 0 and more preferably a negative value.

The method of producing the λ/4 film is not particularly limited. For example, the method described in JP1996-271731A (JP-H08-271731A) can be used, and the content thereof is incorporated in the present invention.

The angle between the slow axis of the λ/4 film and the absorption axis of the polarizer closer to the polarization control layer is preferably 45°.

Here, the λ/4 film refers to an optically anisotropic layer in which the in-plane retardation Re(λ) at a specific wavelength of λ nm satisfies Re(λ=λ/4. The above equation may be achieved at any wavelength in a visible range (for example, 550 nm). In the range, Re(550) of the λ/4 film is preferably 100 to 160 nm.

(Polarization Control Layer for Depolarizing Polarized Light)

The polarization control layer for depolarizing polarized light used in the present invention is not particularly limited. The term "depolarizing polarized light" in the present invention indicates that the degree of polarization is decreased by 50% or more.

The polarization control layer for depolarizing polarized light is described in detail in JP2012-027259A, JP2011-257479A, and the like as a depolarization film.

Polarizer

The liquid crystal display device according to the embodiment of the present invention comprises a viewing side polarizer and a non-viewing side polarizer. In the following description, the term "polarizer" can be applied to both the viewing side polarizer and the non-viewing side polarizer in the present invention.

The polarizer in the present invention is not particularly limited as long as the polarizer is a member having a function of converting light into predetermined linearly polarized light, and an absorptive type polarizer and a reflective type polarizer known in the related art can be used.

As the absorptive type polarizer, an iodine-based polarizer, a dye-based polarizer using a dichroic dye, a polyene-based polarizer, and the like can be used. The iodine-based polarizer and the dye-based polarizer are a coating type polarizer and a stretching type polarizer, any one of these polarizers can be applied, and a polarizer, which is prepared by allowing polyvinyl alcohol to adsorb iodine or a dichroic dye, and performing stretching, is preferable.

In addition, examples of a method of obtaining a polarizer by performing stretching and dyeing in a state of a laminated film in which a polyvinyl alcohol layer is formed on a substrate include methods disclosed in JP504812013, JP5143918B, JP4691205B, JP4751481B, and JP4751486B, and known technologies related to these polarizers can be preferably used.

As the reflective type polarizer, a polarizer in which thin films having different birefringence are laminated, a wire grid type polarizer, a polarizer in which a cholesteric liquid crystal having a selective reflection range and a ¼ wavelength plate are combined, and the like are used.

Among these, from the viewpoint of obtaining more excellent adhesiveness with another layer, a polarizer containing a polyvinyl alcohol-based resin (a polymer including —$CH_2$—CH(OH)— as a repeating unit, particularly, at least one selected from the group consisting of polyvinyl alcohol and an ethylene-vinyl alcohol copolymer is preferable) is preferable.

In the present invention the thickness of the polarizer is not particularly limited and is preferably 3 to 60 μm, more preferably 5 to 30 μm, and even more preferably 5 to 15 μm.

Liquid Crystal Cell

The liquid crystal display device according to the embodiment of the present invention comprises a liquid crystal cell.

The liquid crystal cell in the present invention is preferably of a vertical alignment (VA) mode, an optically compensated bend (OCB) mode, an in-plane-switching (IPS) mode or a twisted nematic (TN) mode but the cell mode is not limited thereto.

In a TN mode liquid crystal cell, rod-like liquid crystal molecules are aligned substantially horizontally in a case in which no voltage is applied and are farther aligned in a twisted manner in a range of 60° to 120°. The TN mode liquid crystal cell is most often used in a color thin film transistor (TFT) liquid crystal display device and is mentioned in numerous literatures.

In a VA mode liquid crystal cell, rod-like liquid crystal molecules are aligned substantially vertically in a case in which no voltage is applied. Examples of the VA mode liquid crystal cells include (1) a narrowly defined VA mode liquid crystal cell (described in JP1990-176625A (JP-H02-176625A)) in which rod-like liquid crystal molecules are aligned substantially vertically in a case in which no voltage is applied and are aligned substantially horizontally in a case in which a voltage is applied, (2) a multi-domain VA mode (MVA mode) liquid crystal cell for enlarging the viewing angle (SID97, Digest of Tech. Papers (Proceedings) 28 (1997) 845), (3) a liquid crystal cell in a mode (n-ASM mode) in which rod-like liquid crystal molecules are aligned substantially vertically in a case in which no voltage is applied and are aligned in twisted multi-domain alignment in a case in which a voltage is applied (Proceedings of Japanese Liquid Crystal Conference, 58 and 59 (1998)), and (4) a SURVIVAL mode liquid crystal cell (presented in LCD International 98). The liquid crystal cell may be of any of a patterned vertical alignment (PVA) type, an optical alignment type, and a polymer-sustained alignment (PSA) type. These modes are described in detail in JP2006-215326A and JP2008-538819A.

In an IPS mode liquid crystal cell, a rod-like liquid crystal compound is aligned substantially parallel with respect to a substrate and application of an electric field parallel to the substrate surface causes the liquid crystal molecules to respond planarly. The IPS mode displays black in a state in which no electric field is applied and a pair of upper and lower polarizing plates have absorption axes which are orthogonal to each other. A method of improving the viewing angle by reducing light leakage during black display in an oblique direction using an optical compensation sheet is described in JP1998-054982A (JP-H10-054982A), JP1999-202323A (JP-H11-202323A), JP1997-292522A (JP-H09-292522A), JP1999-133408A (JP-H11-133408A), JP1999-305217A (JP-H11-305217A), JP1998-307291A (JP-H10-307291A), and the like.

EXAMPLES

Hereinafter, the present invention will be described more specifically using examples. The materials, reagents, amounts and ratios of substances, operations, and the like shown in the examples below can be modified as appropriate without departing from the spirit of the present invention. The scope of the present invention is, therefore, not limited to the specific examples described below.

Preparation of Alignment Film (1) Preparation of Alignment Film

A commercially available cellulose acylate-based film, trade name "FUJITAC TG40UL" (manufactured by Fujifilm Corporation), was prepared as a transparent base material film, and the surface was hydrophilized through saponification treatment. Then, the following alignment film forming composition 1 was applied to the surface using a #12 bar, and dried at 110° C. for 2 minutes to form an alignment film 1 on the transparent base material film.

Composition of Alignment Film Forming Composition 1

| | |
|---|---|
| Modified polyvinyl alcohol below | 2.00 parts by mass |
| Water | 74.08 parts by mass |
| Methanol | 23.76 parts by mass |
| Photopolymerization initiator (IRGACURE 2959, manufactured by BASF) | 0.06 parts by mass |

(Modified Polyvinyl Alcohol)

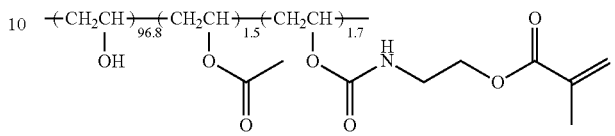

In the formula, the numerical value attached to the repeating unit represents the molar ratio of each repeating unit.

Preparation of Anisotropic Light Absorption Layer (1) Preparation of Anisotropic Light Absorption Layer 1

The following composition 1 was applied to the obtained alignment film using a #27 bar and thus a coating film was formed. The coating film was dried at room temperature for 30 seconds, then heated to 140° C., and retained at 30 seconds. The coating film was then cooled to room temperature. Next, the coating film was heated again to 80° C. for 30 seconds and then cooled to room temperature. The layer prepared in this manner was used as an anisotropic light absorption layer 1.

Composition of Composition 1

| | |
|---|---|
| Dichroic substance D1 | 10.59 parts by mass |
| Dichroic substance D2 | 8.71 parts by mass |
| Liquid crystal compound P1 | 44.13 parts by mass |
| Interface improver F1 | 0.80 parts by mass |
| Interface improver F2 | 0.80 parts by mass |
| Interface improver F3 | 0.96 parts by mass |
| Tetrahydrofuran | 793.9 parts by mass |
| Cyclopentanone | 140.1 parts by mass |

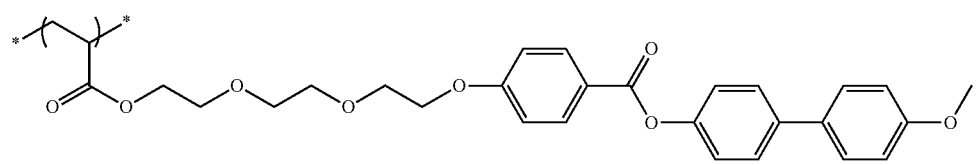

P1

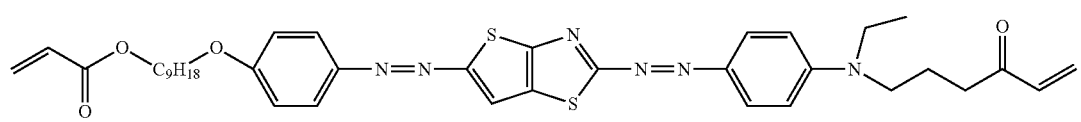

D1

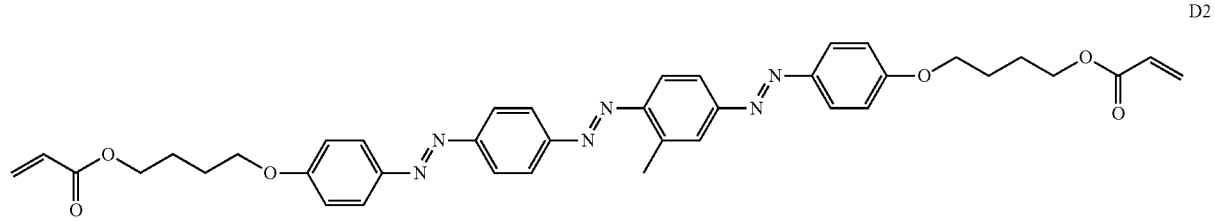

D2

-continued

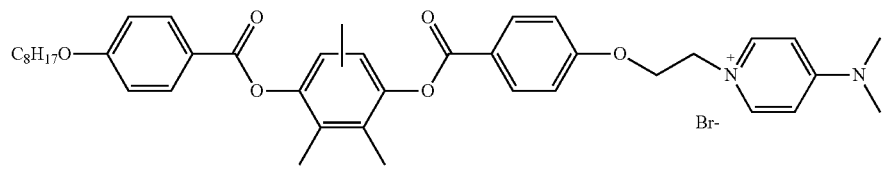

F1

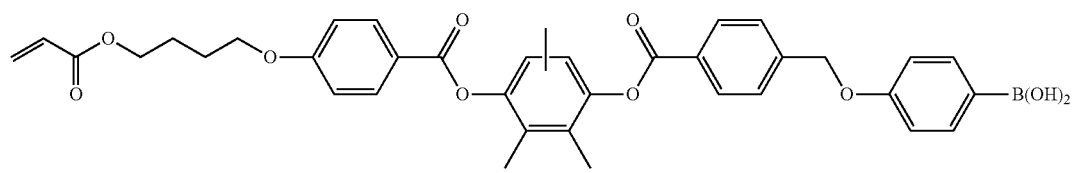

F2

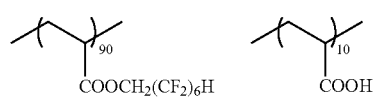

F3

As a result of measuring the alignment degree and the front transmittance of the obtained anisotropic light absorption layer 1, the alignment degree was 0.92, and the front transmittance was 76%. In addition, the absorption axis of the anisotropic light absorption layer 1 was in the thickness direction.

Preparation of Polarizing Plate 1

In the same manner as in the single-sided protective film-attached polarizing plate 02 described in WO2015/166991A, a polarizing plate 1 in which the thickness of the polarizer was 8 μm and one surface of the polarizer was exposed was prepared.

Preparation of Liquid Crystal Display Device 1

An iPad Air model 16 GB (manufactured by APPLE Inc.), which is an IPS mode liquid crystal display device, was decomposed and a liquid crystal cell was removed. A non-viewing side polarizing plate was peeled off from the liquid crystal cell and the polarizing plate 1 prepared above (non-viewing side polarizer) was laminated on the surface from which the non-viewing side polarizing plate was peeled off using a commercially available pressure sensitive adhesive SK2057 (manufactured by Soken Chemical & Engineering Co., Ltd.) so that the surface from which the polarizer was exposed was directed to the liquid crystal cell side. At this time, lamination was performed such that the direction of the absorption axis of the polarizing plate 1 was identical to the direction of absorption axis of the non-viewing side polarizing plate laminated on the product. After the lamination, the components were reassembled and a liquid crystal display device 1 was prepared.

Preparation of Liquid Crystal Display Device 2

A liquid crystal display device 2 was prepared in the same manner as in the preparation of the liquid crystal display device 1 except that the anisotropic light absorption layer 1 was laminated on the viewing side polarizing plate (viewing side polarizer) side of the liquid crystal display device 1 using a pressure sensitive adhesive SK2057 (manufactured by Soken Chemical & Engineering Co., Ltd.).

Preparation of Liquid Crystal Display Device 3

A liquid crystal display device 3 was prepared in the same manner as in the preparation of the liquid crystal display device 1 except that the anisotropic light absorption layer 1 was laminated the polarizing plate 1 (non-viewing side polarizer) side of the liquid crystal display device 1 using a pressure sensitive adhesive SK2057 (manufactured by Soken Chemical & Engineering Co., Ltd.).

Preparation of Liquid Crystal Display Device 4

Two sheets of PURE ACE WR W142 (λ/4) (manufactured by TEEN LIMITED) were laminated on the polarizing plate 1 (non-viewing side polarizer) side of the liquid crystal display device 1 using a pressure sensitive adhesive SK2057 (manufactured by Soken Chemical &. Engineering Co., Ltd.). At this time, lamination was performed such that the angle formed between the absorption axis of the polarizing plate 1 and the slow axis of PURE ACE WR was 43°. After the lamination, the anisotropic light absorption layer 1 was laminated on the PURE ACE WR side using a pressure sensitive adhesive SK2057 (manufactured by Soken Chemical &. Engineering Co., Ltd.). After the lamination, the components were reassembled and a liquid crystal display device 4 was prepared.

Preparation of Liquid Crystal Display Device 5

PURE ACE WR W142 (λ/4) (manufactured by TEIJIN LIMITED) was laminated on the viewing side polarizing plate (viewing side polarizer) side of the liquid crystal display device 3 using a pressure sensitive adhesive SK2057 (manufactured by Soken Chemical & Engineering Co., Ltd.). At this time, lamination was performed such that the angle formed between the absorption axis of the viewing side polarizing plate and the slow axis of PURE ACE WR was 45°. After the lamination, the components were reassembled and a liquid crystal display device 5 was prepared.

Preparation of Liquid Crystal Display Device 6

Two sheets of PURE ACE WR W142 (λ/4) (manufactured by TEIJIN LIMITED) were laminated on the viewing side polarizing plate (viewing side polarizer) side of the liquid crystal display device 3 using a pressure sensitive adhesive SK2057 (manufactured by Soken Chemical & Engineering Co., Ltd.). At this time, lamination was performed such that the angle formed between the absorption axis of the viewing side polarizing plate and the slow axis of PURE ACE WR was 45°. After the lamination, the components were reassembled and a liquid crystal display device 6 was prepared.

Preparation of Liquid Crystal Display Device 7

COSMOSHINE super birefringence type (SRF) (manufactured by TOYOBO Co., LTD.) was laminated on the viewing side polarizing plate (viewing side polarizer) side of the liquid crystal display device 3 using a pressure sensitive adhesive SK2057 (manufactured by Soken Chemical & Engineering Co., Ltd.). At this time, lamination was performed such that the angle formed between the absorption axis of the viewing side polarizing plate and the slow axis of COSMOSHINE was 45°. After the lamination, the components were reassembled and a liquid crystal display device 7 was prepared.

Evaluation of Performance (1) Alignment Degree and Front Transmittance Evaluation.

Using the obtained anisotropic light absorption layer, with AxoScan OPMF-1 (manufactured by Opto Science, Inc.), the Mueller matrix of the anisotropic light absorption layer at a wavelength $\lambda$ was measured within a polar angle from $-50°$ to $50°$ at intervals of $10°$. After the influence of the surface reflection was removed, $ko[\lambda]$ and $ke[\lambda]$ were calculated by fitting the measured values in the following theoretical formula in consideration of the Snell's law and the Fresnel's equation. Unless otherwise specified, the wavelength $\lambda$ is 550 nm.

$$k=-\log(T)\times\lambda/(4\pi d)$$

The absorbance in the in-plane direction and the thickness direction, and the dichroic ratio were calculated from the obtained $ko[\lambda]$ and $ke[\lambda]$ and finally, the vertical alignment degree was obtained.

In addition, the measurement result at a polar angle of $0°$ in which the influence of the surface reflection was removed was used as the front transmittance.

(2) Front Contrast (Front CR) Evaluation and Reflected Glare Evaluation

For each prepared liquid crystal display device, using a measuring machine "EZ-Contrast XL88" (manufactured by ELDIM), the brightness (Yw) in a white display and the brightness (Yb) in a black display within an azimuthal angle from $0°$ (horizontal direction) to $359°$ in a counterclockwise direction at intervals of $1°$ and within a polar angle from $0°$ (front direction) to $88°$ at intervals of $1°$ were measured. As the front contrast, the contrast ratio (Yw0/Yb0) at a polar angle of $0°$ was calculated.

$$CR0(\text{front contrast})=Yw0/Yb0$$

Based on the front contrast CR 1 of the liquid crystal display device 1 of Comparative Example 1, the front contrast was calculated using the following equation.

$$\text{Front contrast ratio}=CR0/CR1$$

The front contrast was evaluated according to the following standards.

A: A case where the front contrast ratio is 1.1 or more

B: A case where the front contrast ratio is smaller than 1.1

Based on the brightness Yw1 in a white display at an azimuthal angle of $90°$ (upper direction from the display screen) and at a polar angle of $45°$ in the liquid crystal display device 1 of Comparative Example 1, the upper direction white brightness ratio was calculated using the following equation.

$$\text{Upper direction white brightness ratio}=Yw/Yw1$$

The reflected glare was evaluated based on the following standards.

A: A case where the upper direction white brightness ratio is 0.5 or less

B: A case where the upper direction white brightness ratio is smaller than 0.5

(3) Polarized Sunglasses Correspondence Evaluation

A video source was displayed on the prepared liquid crystal display device and was observed from the front of the liquid crystal display device to evaluate the visibility of the display screen as viewed via polarized sunglasses (corresponding to polarized sunglasses) based on the following standards. As the polarized sunglasses, polarized sunglasses of which the transmission axis is in a machine direction relative to the surface of the lens were used.

A: The brightness of the display screen rarely changes.

A-: The display screen is slightly dark but is within an acceptable range.

B: The display screen is dark and the video is not easily viewed.

The results of the above evaluation are shown in Tables 1 and 2.

The "Arrangement of each member in liquid crystal display device" in FIG. 5 to FIG. 12 indicates the arrangement of each member in a case of being viewed from the front of the liquid crystal display device. The symbols attached to the viewing side polarizer, the non-viewing side polarizer, and the anisotropic light absorption layer mean the absorption axis direction of each member. For example, in Example 1, the viewing side polarizer has an absorption axis in the transverse direction of the display screen, the non-viewing side polarizer has an absorption axis in the machine direction of the non-viewing side polarizer, and the anisotropic light absorption layer has an absorption axis in the thickness direction.

TABLE 1

|  | Comparative Example 1 | Comparative Example 2 | Comparative Example 3 | Comparative Example 4 |
|---|---|---|---|---|
| Kind of liquid crystal display device | 1 | 2 | 3 | 3 |
| Placing method of liquid crystal display device | Setting longitudinal direction of | Setting longitudinal direction of display screen to machine | Setting longitudinal direction of display screen to machine | Setting longitudinal direction of display screen to transverse |

TABLE 1-continued

|  | Comparative Example 1 | Comparative Example 2 | Comparative Example 3 | Comparative Example 4 |
| --- | --- | --- | --- | --- |
| Placing method of liquid crystal display device | Setting Longitudinal direction of display screen to machine direction | Setting Longitudinal direction of display screen to transverse direction | Setting Longitudinal direction of display screen to transverse direction | Setting Longitudinal direction of display screen to transverse direction |
| Absorption axis direction of viewing side polarizer | Transverse | Transverse | Transverse | Machine |
| Absorption axis direction of non-viewing side polarizer | Machine | Machine | Machine | Transverse |
| Polarized sunglasses correspondence | A | A | A | B |
| Front CR | — | B | A | A |
| Reflected glare | — | A | B | A |

TABLE 2

|  | Example 1 | Example 2 | Example 3 | Example 4 |
| --- | --- | --- | --- | --- |
| Kind of liquid crystal display device | 4 | 5 | 6 | 7 |
| Placing method of liquid crystal display device | Setting Longitudinal direction of display screen to machine direction | Setting Longitudinal direction of display screen to transverse direction | Setting Longitudinal direction of display screen to transverse direction | Setting Longitudinal direction of display screen to transverse direction |
| Absorption axis direction of viewing side polarizer | Transverse | Machine | Machine | Machine |
| Absorption axis direction of non-viewing side polarizer | Machine | Transverse | Transverse | Transverse |
| Polarized sunglasses correspondence | A | A− | A | A− |
| Front CR | A | A | A | A |
| Reflected glare | A | A | A | A |

As shown in Table 2, it could be confirmed that in a case of using the liquid crystal display device including, in order from the viewing side, a viewing side polarizer, a liquid crystal cell, a non-viewing side polarizer, and an anisotropic light absorption layer having an absorption axis in the thickness direction, in which the polarization control layer was arranged on the viewing side of the viewing side polarizer or on the non-viewing side of the non-viewing side polarizer, the reflected glare of the display screen on the windshield could be suppressed, the front contrast was excellent and the visibility of the display screen as viewed via polarized sunglasses was excellent (Examples 1 to 4).

From the comparison of Examples 2 and 3, it could be confirmed that in a case where the absorption, axis of the viewing side polarizer was in the machine direction, the absorption axis of the non-viewing side polarizer was in the transverse direction, and the polarization control layer was arranged on the viewing side of the viewing side polarizer, as long as the polarization control layer was a polarization control layer (λ/2 film) for converting the polarization axis of linearly polarized light vertically incident into the plane of the polarization control layer (Example 3), compared to a case where the polarization control layer is a polarization control layer (λ/4 film) for converting linearly polarized light vertically incident into the plane of the polarization control layer into circularly polarized light (Example 2), the visibility of the display screen as viewed via polarized sunglasses was more excellent.

In contrast, as shown in Table 1, it could be confirmed that in a case of using the liquid crystal display device not including a polarization control layer, at least one of reflected glare of the display screen on the windshield, front contrast, or visibility of the display screen as viewed via polarized sunglasses was deteriorated.

EXPLANATION OF REFERENCES 1, 1A, 1B, 11: polarization control layer
2, 12: viewing side polarizer
3, 13: liquid crystal cell
4, 14: non-viewing side polarizer
5, 15: anisotropic light absorption layer
10, 10A, 10B, 20: liquid crystal display device
X, Y, Z: direction

What is claimed is:
1. A liquid crystal display device comprising, in order from a viewing side:
a viewing side polarizer;
a liquid crystal cell;

a non-viewing side polarizer; and an anisotropic light absorption layer including a dichroic substance which is aligned such that an absorption axis of the dichroic substance is in a thickness direction of the layer, wherein the liquid crystal display device further comprises at least one polarization control layer, the polarization control layer is arranged on a viewing side of the viewing side polarizer or on a non-viewing side of the non-viewing side polarizer, wherein on condition that the polarization control layer is arranged on the viewing side of the viewing side polarizer, the non-viewing side polarizer and the anisotropic light absorption layer are in contact with each other, and wherein on condition that the polarization control layer is arranged on the non-viewing side of the non-viewing side polarizer, the non-viewing side polarizer and the polarization control layer are in contact with each other.

2. The liquid crystal display device according to claim 1, wherein an absorption axis of the viewing side polarizer is in a machine direction, and an absorption axis of the non-viewing side polarizer is in a transverse direction, the polarization control layer is arranged on a viewing side of the viewing side polarizer, and the polarization control layer rotates linearly polarized light vertically incident into a plane of the polarization control layer by 80° to 100°.

3. The liquid crystal display device according to claim 1, wherein an absorption axis of the viewing side polarizer is in a machine direction, and an absorption axis of the non-viewing side polarizer is in a transverse direction, the polarization control layer is arranged on a viewing side of the viewing side polarizer, and the polarization control layer converts a polarization axis of linearly polarized light vertically incident into a plane of the polarization control layer.

4. The liquid crystal display device according to claim 1, wherein an absorption axis of the viewing side polarizer is in a machine direction, and an absorption axis of the non-viewing side polarizer is in a transverse direction, the polarization control layer is arranged on a viewing side of the viewing side polarizer, and the polarization control layer converts linearly polarized light vertically incident into a plane of the polarization control layer into circularly polarized light.

5. The liquid crystal display device according to claim 1, wherein an absorption axis of the viewing side polarizer is in a machine direction, and an absorption axis of the non-viewing side polarizer is in a transverse direction, the polarization control layer is arranged on a viewing side of the viewing side polarizer, and the polarization control layer depolarizes polarized light.

6. The liquid crystal display device according to claim 1, wherein an absorption axis of the viewing side polarizer is in a transverse direction, and an absorption axis of the non-viewing side polarizer is in a machine direction, the polarization control layer is arranged on a non-viewing side of the non-viewing side polarizer, and the polarization control layer rotates linearly polarized light vertically incident into a plane of the polarization control layer by 80° to 100°.

7. The liquid crystal display device according to claim 1, wherein an absorption axis of the viewing side polarizer is in a transverse direction, and an absorption axis of the non-viewing side polarizer is in a machine direction, the polarization control layer is arranged on a non-viewing side of the non-viewing side polarizer, and the polarization control layer converts a polarization axis of linearly polarized light vertically incident into a plane of the polarization control layer.

* * * * *